US008930292B2

(12) United States Patent
Large

(10) Patent No.: US 8,930,292 B2
(45) Date of Patent: Jan. 6, 2015

(54) LEARNING AND AUDITORY SCENE ANALYSIS IN GRADIENT FREQUENCY NONLINEAR OSCILLATOR NETWORKS

(75) Inventor: Edward W. Large, Boca Raton, FL (US)

(73) Assignee: Circular Logic, LLC, Boca Raton, FL (US)

( * ) Notice: Subject to any disclaimer, the term of this patent is extended or adjusted under 35 U.S.C. 154(b) by 624 days.

(21) Appl. No.: 13/016,741

(22) Filed: Jan. 28, 2011

(65) Prior Publication Data

US 2011/0202489 A1    Aug. 18, 2011

Related U.S. Application Data

(60) Provisional application No. 61/299,768, filed on Jan. 29, 2010.

(51) Int. Cl.
G06F 15/18 (2006.01)

(52) U.S. Cl.
USPC .................. 706/25; 706/16; 706/18; 706/22

(58) Field of Classification Search
USPC ............................................................ 706/25
See application file for complete search history.

(56) References Cited

U.S. PATENT DOCUMENTS

| | | | |
|---|---|---|---|
| 4,584,710 | A | 4/1986 | Hansen |
| 5,446,828 | A | 8/1995 | Woodall |
| 5,751,899 | A | 5/1998 | Large et al. |
| 7,376,562 | B2 | 5/2008 | Large |
| 2004/0162796 | A1 | 8/2004 | Nugent |
| 2005/0234366 | A1 | 10/2005 | Heinz et al. |
| 2005/0283360 | A1 | 12/2005 | Large |
| 2007/0005348 | A1 | 1/2007 | Klefenz |

OTHER PUBLICATIONS

Izhikevich, Weakly Pulse-Coupled Oscillators, FM Interactions, Synchronization, and Oscillatory Associative Memory [online], 1999 [retrieved on Mar. 24, 2013]. Retrieved from the Internet<URL: http://ieeexplore.ieee.org/stamp/stamp.jsp?tp= &arnumber=761708>.*
Hoppensteadt, et al. Synaptic organizations and dynamical properties of weakly connected neural oscillators. Article [online]. Apr. 1996 [retrieved on Apr. 30, 2011]. Retrieved from the Internet: <URL: http://www.izhikevich.org/publications/bc2.pdf> entire document.

(Continued)

*Primary Examiner* — Jeffrey A Gaffin
*Assistant Examiner* — Nathan Brown, Jr.
(74) *Attorney, Agent, or Firm* — Edwards Wildman Palmer LLP; Howard M. Gitten

(57) ABSTRACT

A method for learning connections between nonlinear oscillators in a neural network comprising the steps of providing a plurality of nonlinear oscillators, with each respective oscillator producing an oscillation distinct from the others in response to an input and detecting an input at an at least first oscillator of the plurality of nonlinear oscillators. Detecting an input at an at least a second oscillator of the plurality of nonlinear oscillators, comparing the oscillation of the at least first oscillator to the oscillation of the at least second oscillator at a point in time, and determining whether there is coherency between the oscillation of the at least first oscillator and the oscillation of the at least second oscillator. Changing at least one of the amplitude and phase of a connection between the at least first oscillator and the at least second least oscillator as a function coherency between the at least first oscillator and the oscillation of the at least second oscillator.

13 Claims, 7 Drawing Sheets

(56) References Cited

OTHER PUBLICATIONS

Dixon; A Beat Tracking System for Audio Signals, Article [online]. Apr. 2000 [retrieved on Apr. 30, 2011], Retrieved from the Internet: <URL:http://citeseerx.ist.psu.edu/viewdoc/download?doi=10.1.1.28.1409&rep=rep1&type=pdf> entire document.

Zhigulin, Multiple-scale Dynamics in Neural Systems: Learning, Synchronization and Network Oscillations. Article [online]. May 2004 [retrieved on Apr. 30, 2011] Retrieved from the internet: <URL:http://thesis.library.caltech.edu/1770/1/main.pdf> entire document.

International Search Report of PCT/US2011/023020.

Large, Edward et al.; "A Conical Model for Gradient Frequency Neural Networks"; Physica D, North-Holland, Amsterdam, NL, vol. 239, No. 12, Jan. 18, 2010; pp. 905-911.

Hoppensteadt, Frank C. et.al.; "Associative Memory of Weakly Oscillators"; Neural Networks 1997, International Conference on Houston, TX, Jun. 9-12, 1997, vol. 2, Jun. 9, 1997; pp. 1135-1138.

Wang, DeLiang; "An Oscillation Model of Auditory Stream Segregation"; IEEE International Conference on Neural Networks Proceedings; Oct. 1, 1994; pp. 198-200.

Large, Edward W.; "Neurodynamics of Music"; In: Music Perception, Jan. 1, 2010, Springer New York; vol. 36, pp. 201-231.

Supplementary European Search Report for EP 11 73 7774 dated Mar. 17, 2014.

\* cited by examiner

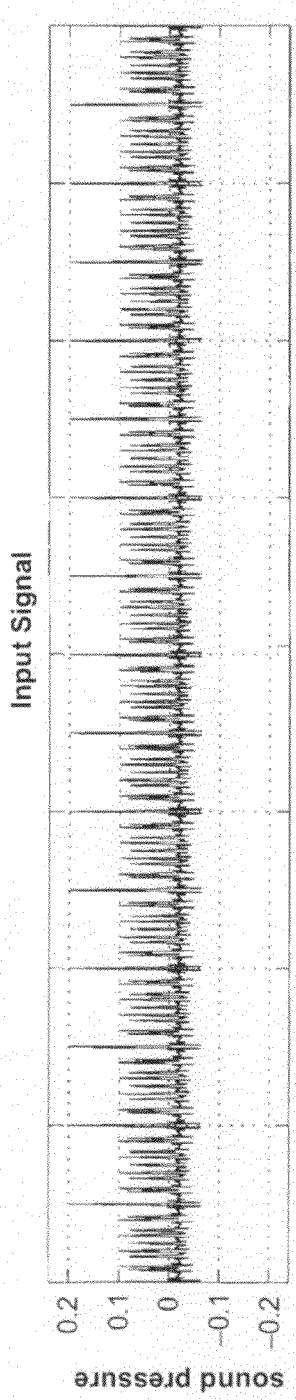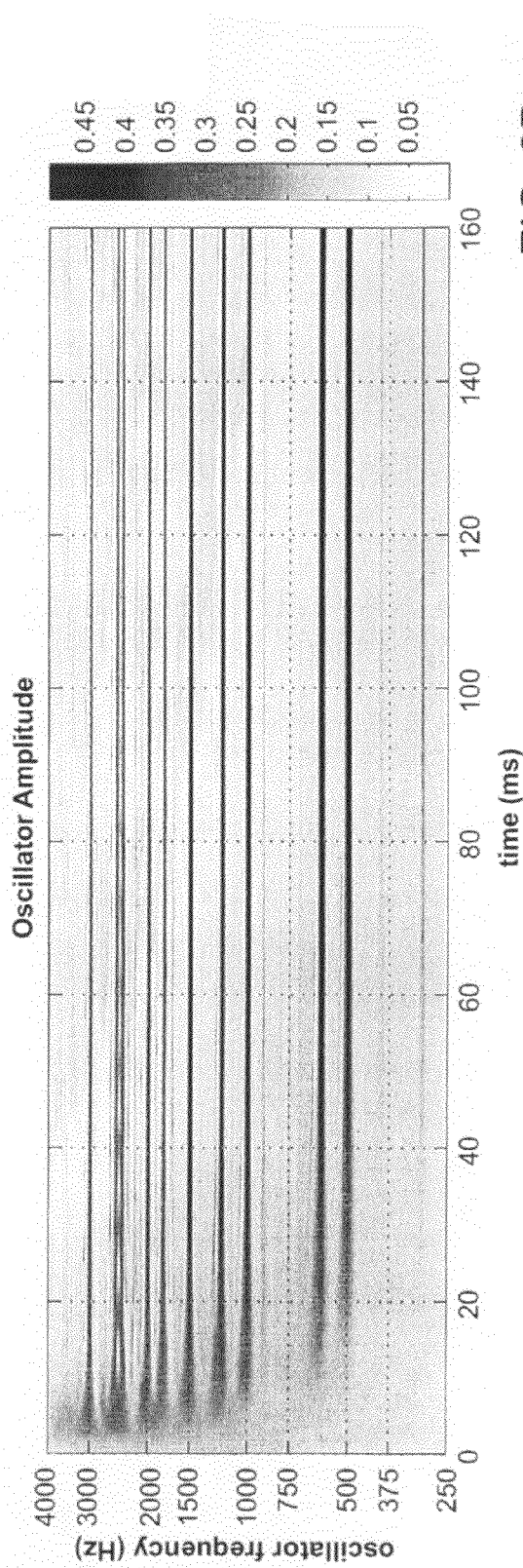
FIG. 3A
FIG. 3B

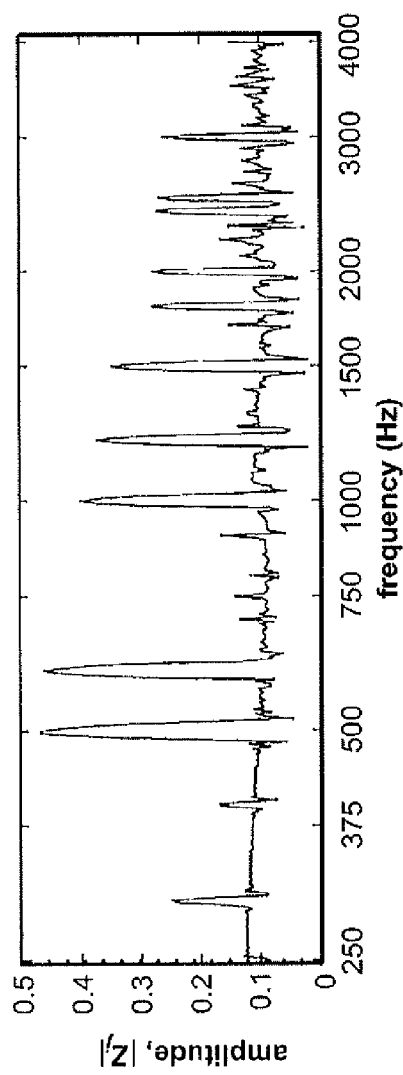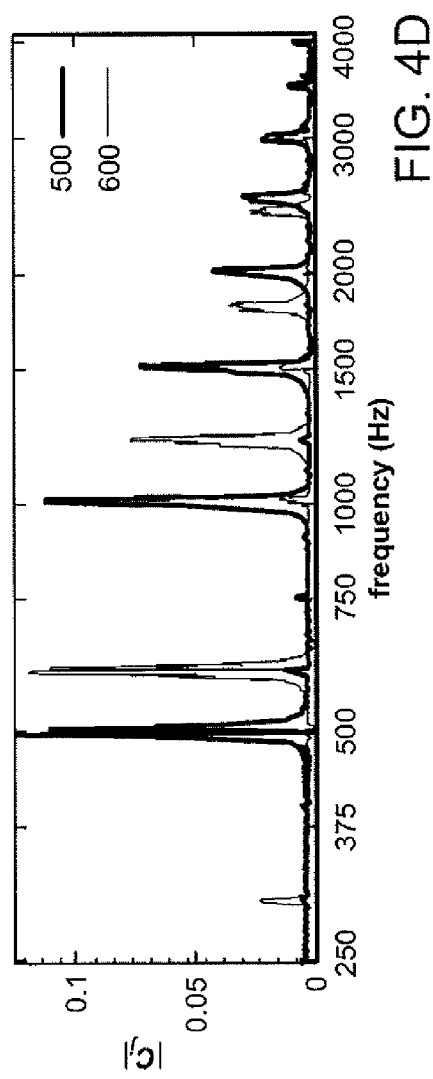
FIG. 4A
FIG. 4D

LEARNING AND AUDITORY SCENE ANALYSIS IN GRADIENT FREQUENCY NONLINEAR OSCILLATOR NETWORKS

CROSS REFERENCE TO RELATED APPLICATIONS

This application claims priority to U.S. provisional application No. 61/299,768 filed on Jan. 29, 2010 in its entirety.

FEDERALLY SPONSORED RESEARCH OR DEVELOPMENT

The United States Government has rights in this invention pursuant to Contract No. FA9550-07-00095 between Air Force Office of Scientific Research and Circular Logic, LLC and Contract No. FA9550-07-C-0017 between Air Force Office of Scientific Research and Circular Logic, LLC.

BACKGROUND OF THE INVENTION

This invention is directed to the perception and recognition of audio signal inputs and, more particularly, to a signal processing method and apparatus for providing a nonlinear frequency analysis of structured signals in a manner which more closely mimics the operation of the human ear and brain.

The use of an array of nonlinear oscillators to process input audio signal is known in the art from U.S. Pat. No. 7,376,562 granted to Edward W. Large (Large).

The human ear has been modeled as a plurality of oscillators tuned to different frequencies. The brain processes these inputs from the oscillators by connecting oscillator pairs as needed to interpret sound inputs. Audio sounds naturally occurring in the world are complex signals, as a result, the developed human ear is a complex processor making use of these connections between oscillators. In nature, connections between oscillators are changing and connection patterns are learned responses to repeated inputs. This results in an increase in synaptic efficiency between presynaptic cells and postsynaptic cells. It is also known from prior art modeling that connection between two oscillators has both a strength (amplitude) and a natural phase.

It is generally known from Large to process signals using networks of nonlinear oscillators. Nonlinear resonance provides a wide variety of behaviors that are not observed in linear resonance (e.g., neural oscillations). Moreover, as in nature, oscillators can be connected into complex networks. FIG. 1 shows a typical architecture used to process acoustic signals. It consists of a network 100 of layers of one-dimensional arrays of nonlinear oscillators, called gradient-frequency nonlinear oscillator networks (GFNNs). In FIG. 1, GFNNs are arranged into processing layers to simulate auditory processing by the cochlea (102) at layer 1 (the input layer), dorsal cochlear nucleus (DCN) (104) at layer 2, and inferior colliculus (106) (ICC) at layer 3. From a physiological point of view, nonlinear resonance models outer hair cell nonlinearities in the cochlea, and phase-locked neural responses on the DCN and ICC. From a signal processing point of view, processing by multiple GFNN layers is not redundant; information is added at every layer due to nonlinearities.

More specifically, as illustrated in FIG. 2, an exemplary nonlinear oscillator system is comprised of a network 402 of nonlinear oscillators $405_1$, $405_2$, $405_3$ ... $405_N$. An input stimulus layer 401 can communicate an input signal to the network 402 through a set of the stimulus connections 403. In this regard, the input stimulus layer 401 can include one or more input channels $406_1$, $406_2$, $406_3$ ... $406_C$. The input channels can include a single channel of multi-frequency input, two or more channels of multi-frequency input, or multiple channels of single frequency input, as would be provided by a prior frequency analysis. The prior frequency analysis could include a linear method (Fourier transform, wavelet transform, or linear filter bank, methods that are well-known in the art) or another nonlinear network, such as another network of the same type.

Assuming C input channels as shown in FIG. 2, then the stimulus on channel $406_C$ at time t is denoted $x_C$(t), and the matrix of stimulus connections 403 may be analyzed as strength of a connection from an input channel $406_C$ to an oscillator $405_N$, for a specific resonance, as known from Large. Notably, the connection matrix can be selected so that the strength of one or more of these stimulus connections is equal to zero.

Referring again to FIG. 2, internal network connections 404 determine how each oscillator $405_N$ in the network 402 is connected to the other oscillators $405_N$. As known from Large, these internal connections may be denoted as a matrix of complex-valued parameters, each describing the strength of the connection from one oscillator $405_M$ to another oscillator $405_N$, for a specific resonance, as explained next.

As known from Large, signal processing by networks of nonlinear oscillators can be performed to broadly mimic the ear response. This is similar to signal processing by a bank of linear filters, but with the important difference that the processing units are nonlinear, rather than linear oscillators. In this section, this approach is explained by comparing it with linear time-frequency analysis.

A common signal processing operation is frequency decomposition of a complex input signal, for example by a Fourier transform. Often this operation is accomplished via a bank of linear bandpass filters processing an input signal, x(t). For example, a widely used model of the cochlea is a gammatone filter bank (Patterson, et al., 1992). For comparison with our model a generalization can be written as a differential equation $$\dot{z}=z(\alpha+i\omega)+x(t) \qquad (1)$$

where the overdot denotes differentiation with respect to time (for example, dz/dt), z is a complex-valued state variable, ω, is radian frequency (ω=2πf, f in Hz), α<0 is a linear damping parameter. The term, x(t), denotes linear forcing by a time-varying external signal. Because z is a complex number at every time, t, it can be rewritten in polar coordinates revealing system behavior in terms of amplitude, r, and phase, φ. Resonance in a linear system means that the system oscillates at the frequency of stimulation, with amplitude and phase determined by system parameters. As stimulus frequency, $\omega_0$, approaches the oscillator frequency, w, oscillator amplitude, r, increases, providing band-pass filtering behavior.

Recently, nonlinear models of the cochlea have been proposed to simulate the nonlinear responses of outer hair cells. It is important to note that outer hair cells are thought to be responsible for the cochlea's extreme sensitivity to soft sounds, excellent frequency selectivity and amplitude compression (e.g., Egulluz, Ospeck, Choe, Hudspeth, & Magnasco, 2000). Models of nonlinear resonance that explain these properties have been based on the Hopf normal form for nonlinear oscillation, and are generic. Normal form (truncated) models have the form $$\dot{z}=z(\alpha+i\omega+\beta|z|^2)+x(t)+\text{h.o.t.} \qquad (2)$$

Note the surface similarities between this form and the linear oscillator of Equation 1. Again ω is radian frequency, and α is still a linear damping parameter. However in this nonlinear formulation, α becomes a bifurcation parameter which can assume both positive and negative values, as well as α=0. The value α=0 is termed a bifurcation point. β<0 is a nonlinear damping parameter, which prevents amplitude from blowing up when α>0. Again, x(t) denotes linear forcing by an external signal. The term h.o.t. denotes higher-order terms of the nonlinear expansion that are truncated (i.e., ignored) in normal form models. Like linear oscillators, nonlinear oscillators come to resonate with the frequency of an auditory stimulus; consequently, they offer a sort of filtering behavior in that they respond maximally to stimuli near their own frequency. However, there are important differences in that nonlinear models address behaviors that linear ones do not, such as extreme sensitivity to weak signals, amplitude compression and high frequency selectivity. The compressive gammachirp filterbank exhibits similar nonlinear behaviors, to Equation 2, but is formulated within a signal processing framework Wino & Patterson, 2006).

Large taught expanding the higher order terms of Equation 2 to enable coupling among oscillators of different frequencies. This enables efficient computation of gradient frequency networks of nonlinear oscillators, representing an improvement to the technology. As known from applicant's copending application Ser. No. 13,916,713, the canonical model (Equation 3) is related to the normal form (Equation 2; see, e.g., Hoppensteadt & Izhikevich, 1997), but it has properties beyond those of Hopf normal form models because the underlying, more realistic oscillator model is fully expanded, rather than truncated. The complete expansion of higher-order terms produces a model of the form $$\dot{z}_i = z_i \left( \alpha_i + i\omega_i + (\beta_{1i} + i\delta_{1i})|z_i|^2 + \frac{(\beta_{2i} + i\delta_{2i})\varepsilon|z_i|^4}{1 - \varepsilon|z_i|^2} \right) + cP(\varepsilon, x(t))A(\varepsilon, \bar{z}_i) \quad (3)$$

Equation 3 describes a network of n nonlinear oscillators. There are again surface similarities with the previous models. The parameters, ω, α and $\beta_1$ correspond to the parameters of the truncated model. $\beta_2$ is an additional amplitude compression parameter, and c represents strength of coupling to the external stimulus. Two frequency detuning parameters $\delta_1$ and $\delta_2$ are new in this formulation, and make oscillator frequency dependent upon amplitude (see FIG. 3C). The parameter ε controls the amount of nonlinearity in the system. Most importantly, coupling to a stimulus is nonlinear and has a passive part, P(ε, x(t)) and an active part, A(ε,$\bar{z}$) producing nonlinear resonances.

Equation 3 above is generally stated in terms of a time-varying input signal x(t). Here x(t) may be an input audio source signal, or it may be input from other oscillators in the same network or oscillators in other networks. Several cases of the latter are illustrated in FIG. 1, labeled as "internal coupling", "afferent coupling" and "efferent coupling". In such cases, x(t) results from the multiplication of a matrix of connection values with a vector of oscillator state variables, representing a gradient frequency neural network. Equation 3 accounts for these different inputs, but for ease of explanation includes a single generic input source, x(t). This system, and particularly the construction of the nonlinear coupling expressions, is described in detail in copending patent application Ser. No. 13/016,713.

The Large method and system for the behavior of a network of nonlinear oscillator better mimics the complexity of the ear response to complex audio signals than the prior art linear models. However, it still suffers from the disadvantage that unlike the auditory system, it can not learn the connections between oscillator pairs, rather, information must be known about the input audio signal ahead of time to determine which connections among the oscillators would be the most significant. Large enables connection of oscillators within and between gradient frequency nonlinear oscillator networks, as illustrated in FIG. 1. However, it required that connections be designed by hand to provide the desired behavior of a network. In short, the Large system is static, not dynamic in its connection pattern.

SUMMARY OF THE INVENTION

A method by which connections within and between nonlinear oscillators of different oscillator arrays is learned through passive exposure to an audio input signal is provided. A plurality of nonlinear oscillators, each producing an oscillation distinct from the other in response to an input is provided. Each oscillator is capable of being connected to at least one other oscillator. An input at an at least first oscillator is detected. An input at least a second oscillator is detected. The oscillations of the at least first oscillator is compared to the oscillation of the at least second oscillator at a point in time. If the oscillation of the first oscillator is coherent with the oscillation of the second oscillator, then the amplitude of the connection between the at least first oscillator and the at least second oscillator is increased and the phase is adjusted to reflect an ongoing phase relationship between the two. If the oscillation of the at least first oscillator is not coherent with the oscillation of the at least second oscillator, then the amplitude of the connection between the two is reduced and phase may be adjusted.

BRIEF DESCRIPTION OF THE DRAWINGS

Other objects, features and advantages of the present invention will be apparent from the written description and the drawings in which:

FIG. 1A is a schematic representation of the analogous neuron oscillator response for a nonlinear oscillator;

FIGS. 3A and 3B are graphical representations of complex tones and the response of the oscillator network in accordance with the invention;

FIGS. 4A-D are graphical representations of the output of the learning process in accordance with the invention.

DETAILED DESCRIPTION OF THE PREFERRED EMBODIMENTS

Figure 1:
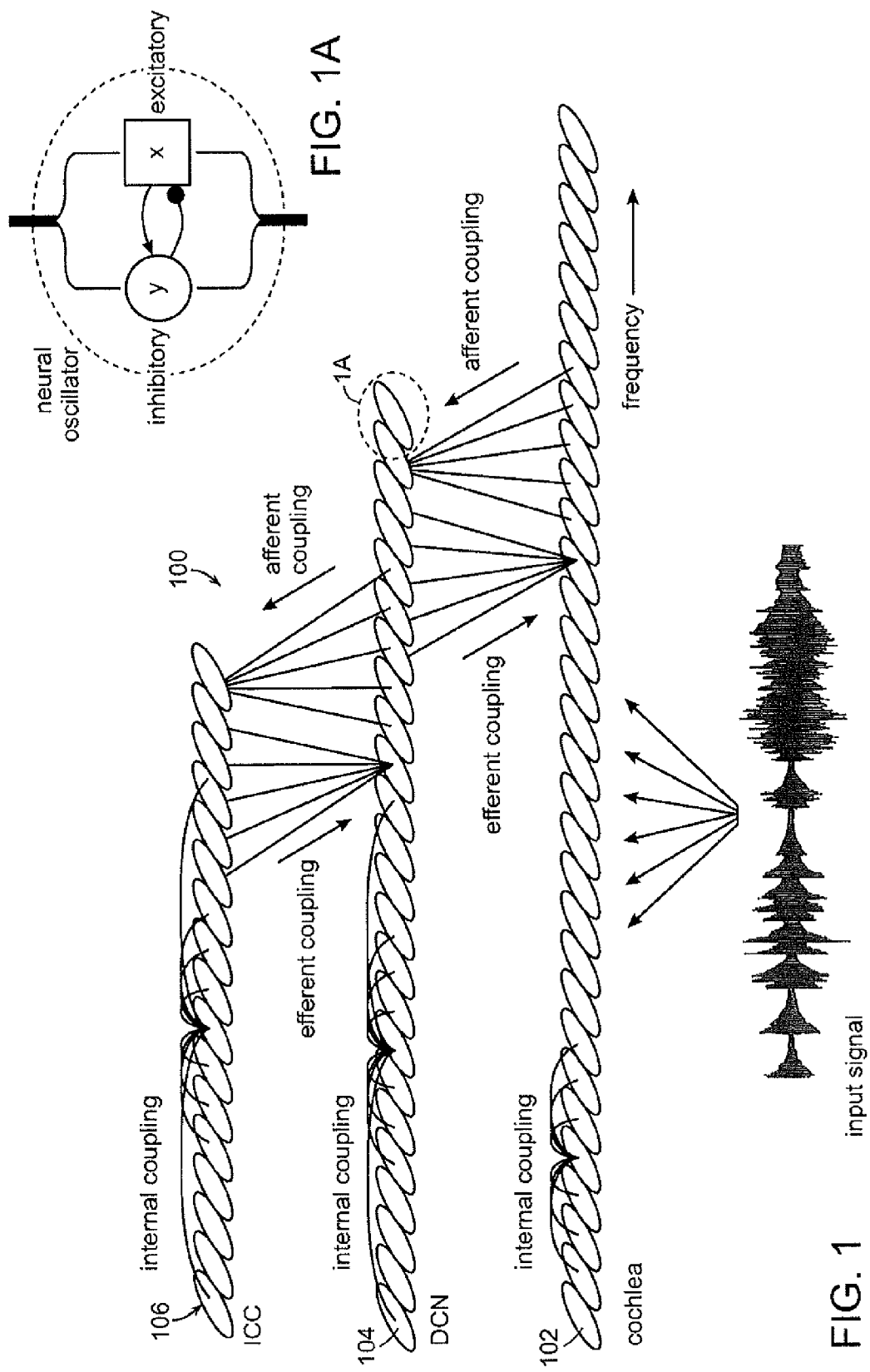
FIG. 1 is a diagram illustrating the basic structure of a nonlinear neural network.
Figure 2:
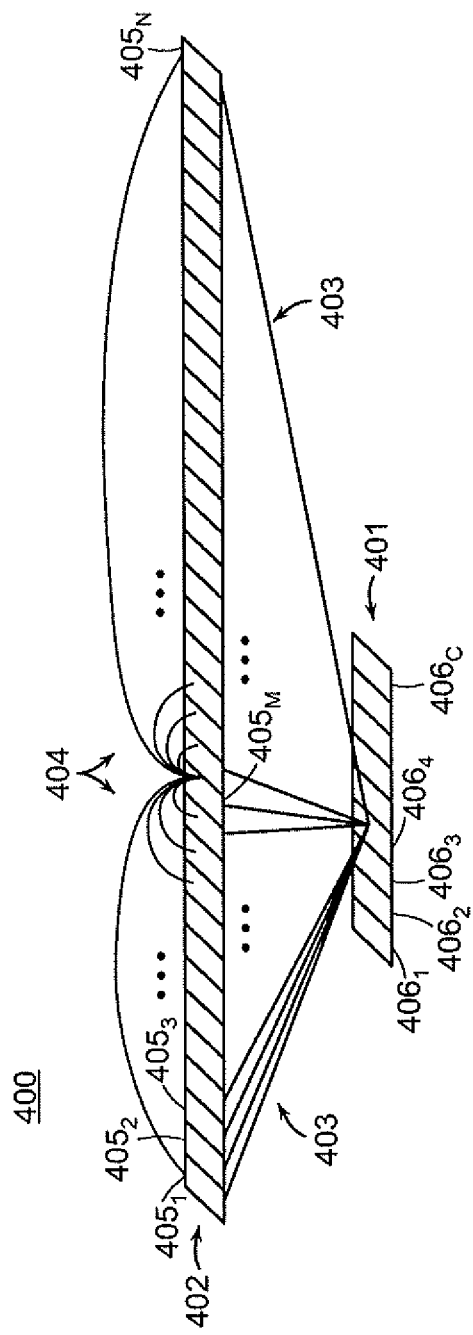
FIG. 2 is a further diagram illustrating the basic structure of a nonlinear network and its relation to the input signal in accordance with the invention.

This invention provides a method by which connections between oscillators within a network and between different networks can be learned automatically, through passive exposure to signals.

In the brain, connections between neurons can be modified via Hebbian learning (Hoppensteadt & Izhikevich, 1996b), providing a mechanism for synaptic plasticity wherein the repeated and persistent co-activation of a presynaptic neuron and a postsynaptic neuron lead to an increase in synaptic efficacy between them. Previous analysis of learning in neural systems reveals that connections between two oscillators has both a strength and a natural phase (Hoppensteadt & Izhikevich, 1996a, 1997). Hebbian learning rules have been proposed for neural oscillators and the single-frequency case has been studied in some detail. Both connection strength and phase can be learned by the Hebbian mechanism if a near-resonant relationship exists between their natural frequencies (Hoppensteadt & Izhikevich, 1996b). However, current algorithms only learn connections between oscillators whose natural frequency ratios are near 1:1. For the 1:1 case, a canonical version of the Hebbian learning rule can be written as follows (Hoppensteadt & Izhikevich, 1996b):

$$\dot{c}_{ij} = -\delta c_{ij} + k_{ij} z_i \bar{z}_j \quad (4)$$

Wherein $c_{ij}$ is a complex number, representing the magnitude and phase of the connection between any two nonlinear oscillators at a point in time, and $\delta_{ij}$ and $k_{ij}$ are parameters representing the speed of change of the connection. The variables, $z_i$ and $z_j$ as known from above, are the complex valued state variables of the two oscillators connected by $c_{ij}$.

The above model can learn both amplitude (strength) and phase information for two oscillators with a frequency ratio near 1:1 by way of example in this embodiment. For in the instant invention, in which oscillators of different frequencies communicate, it is necessary to specify a method for learning of connections between oscillators of different frequencies.

This patent describes a Hebbian learning mechanism that can learn connections between oscillators of different frequencies. A modification of the learning algorithm provides a multi-frequency phase coherence measure that enables auditory scene analysis.

Multi-frequency networks exhibit higher-order resonances, upon which our algorithm is based. The following learning rule enables the learning of higher order resonant relationships in our canonical network:

$$\dot{c}_{ij} = -\delta_{ij} c_{ij} + k_{ij} (z_i + \sqrt{\epsilon} z_i^2 + \epsilon z_i^3 + \ldots) \cdot (\bar{z}_j + \sqrt{\epsilon} \bar{z}_j^2 + \epsilon \bar{z}_j^3 + \ldots) \quad (5)$$

where the infinite series can be summed to arrive at.

$$\dot{c}_{ij} = -\delta_{ij} c_{ij} + k_{ij} \frac{z_i}{1 - \sqrt{\epsilon} z_i} \cdot \frac{\bar{z}_j}{1 - \sqrt{\epsilon} \bar{z}_j} \quad (6)$$

To illustrate the behavior of the learning algorithm, a stimulus was generated consisting of two complex, steady state tones, shown in FIG. 3A. Tone 1 was a harmonic complex consisting of frequencies 500, 1000, 1500, 2000, and 2500 Hz. Tone 2 was a harmonic complex consisting of frequencies 600, 1200, 1800, 2400, and 3000 Hz by way of non-limiting example. A three-layer network of nonlinear oscillators processed the sound mixture. Layers 1 and 2 of the network of oscillators operated in the critical parameter regime (i.e. $\alpha=0$), and layer 3 operated in the active parameter regime (i.e. $\alpha>0$). The parameter $\beta_1$ was set to $\beta_1=-100$ for layer 1, $\beta_1=-10$ for layer 2 and $\beta_1=-1$ for layer 3. By way of non-limiting example, other parameters were $\beta_2=-1$, $\delta_1=\delta_2=0$, $\epsilon=1$ as controls. The response of the layer 3 network to this stimulus (oscillator amplitude, |z| as a function of time) is shown in FIG. 3B.

Figure 5:
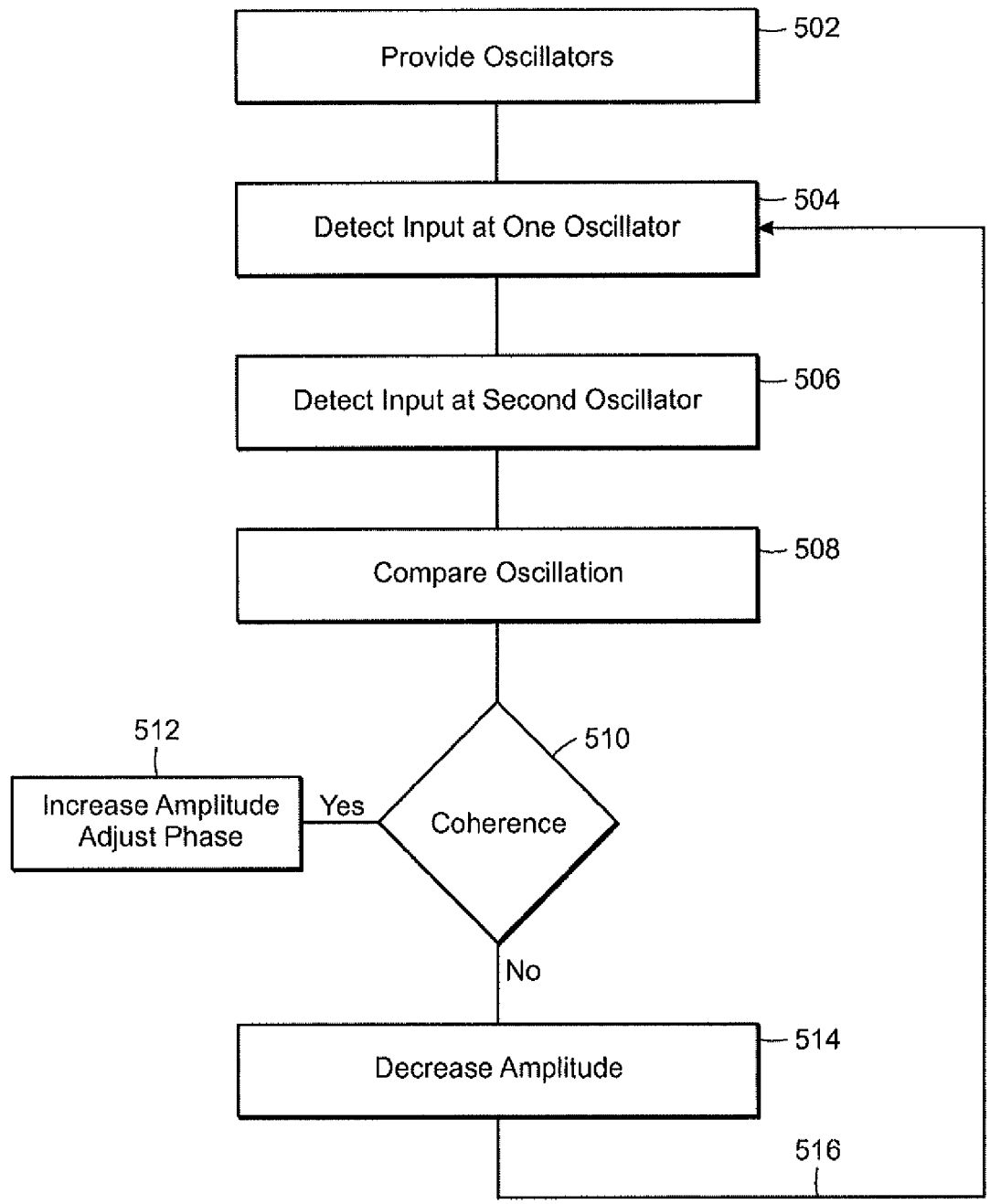
FIG. 5 is a flow chart of a learning algorithm for operating a network of nonlinear oscillators in accordance with the invention.

Reference is now made to FIG. 5 in which a flow chart of the learning process is provided. In a first step 502, a plurality of nonlinear oscillators, each oscillator producing an oscillation distinct from the other, is provided (by way of example as shown in network 400). Each oscillator $405_1$-$406_c$ is capable of forming a connection with any other oscillator either in its own layer 401, 402 or an adjacent layer of the next highest order. However, for simplicity of explanation, network as used herein corresponds solely to an individual linear array of oscillators such as array 102 or 402.

An input is detected at least one oscillator $405_M$ of the plurality of nonlinear oscillators 402 causing an oscillation at oscillator $405_M$ in step 504. In a step 506, an input is detected at a second oscillator, $405_N$ by way of example of the plurality of oscillators 402 causing an oscillation of the second oscillator $405_N$. It should be understood that the value of the input and/or the oscillation may be zero or may be the natural oscillation frequency of the respective oscillators. In a step 508, the oscillation of oscillator $405_M$ is compared to the oscillation of the second oscillator $405_N$ at a point in time. The comparison may be a comparison of the oscillation frequencies. In a step 510, it is determined whether the oscillation of oscillator $405_M$ is coherent with the oscillation of the second oscillator $405_N$.

If the oscillations are coherent, then in a step 512 the amplitude of the connection between the at least one oscillator and the second oscillator is increased and the phase is adjusted to reflect the ongoing phase relationship between the two oscillators $405_M$, $405_N$. If it is determined in step 510 that the oscillation of oscillator $405_M$ and oscillator $405_N$ are not coherent, then the amplitude of the connection is reduced driving that connection towards zero and phase may be adjusted. The process is iterated in a step 516 and returned to step 504 so long as there is an input to system 400.

Figure 4B:
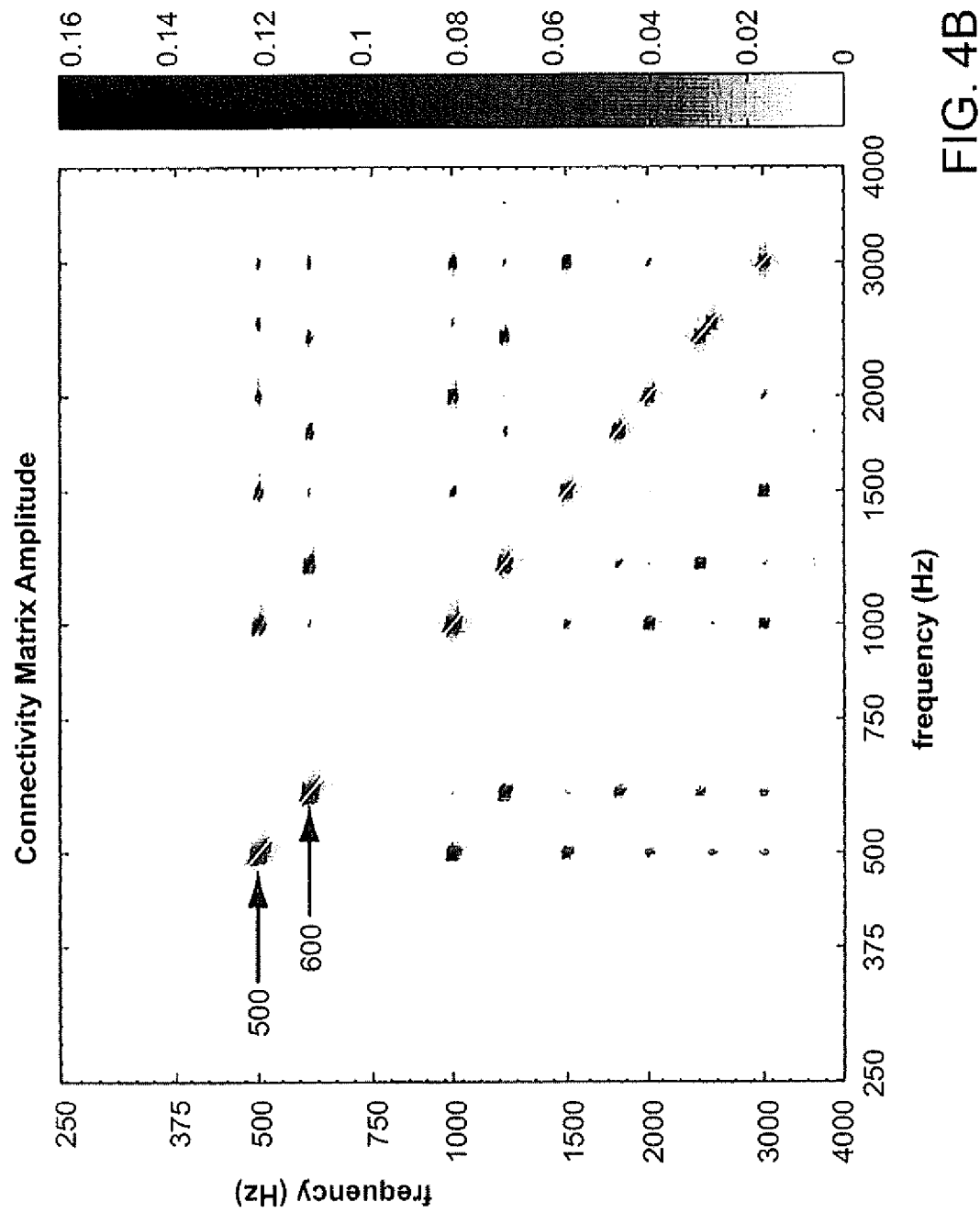
Figure 4C:
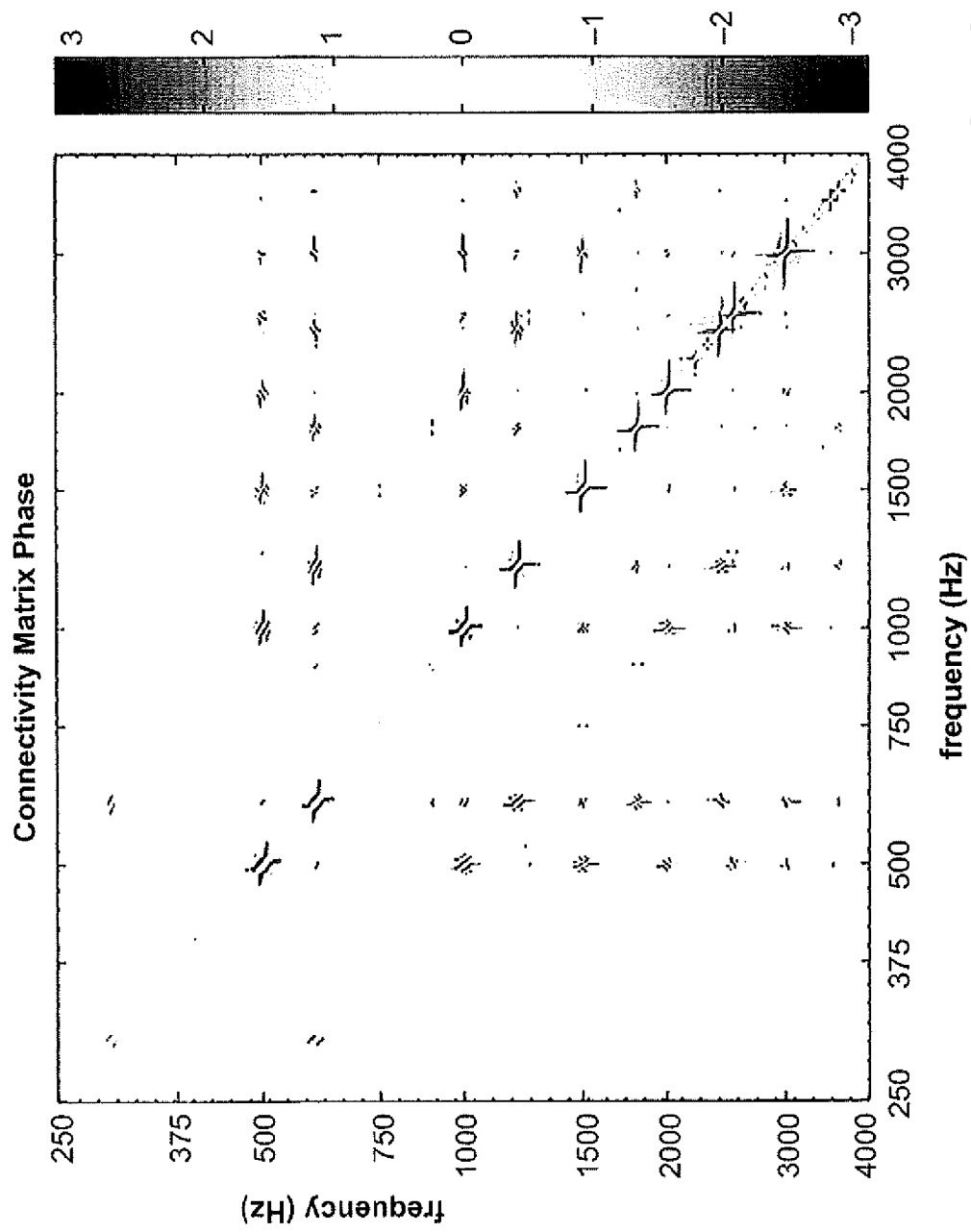

The learning algorithm discussed above in connection with FIG. 5 was implemented asynchronously (i.e., after the network had been run), processing the final 10 ms of the networks neural layer output produced by the PCN array of oscillators by way of non-limiting example. The result of learning is shown in FIG. 4. Panel A shows the amplitude response of the oscillator network, averaged over the last 10 ms. Reading counterclockwise, Panels B and C show the amplitude and phase of the connection matrix. In the amplitude matrix (Panel B) the peaks in the rows corresponding to the 500 Hz and 600 Hz oscillators are different. These peaks identify those oscillators whose activity is phase coherent with the oscillators of interest (500 and 600 Hz) over the relevant time scale. Panel D focuses on two rows of the amplitude matrix (Panel B), showing the amplitudes as a function of frequency. The oscillators associated with the 500 Hz oscillator (those with frequencies near 500, 1000, 1500, 2000, and 2500) are different from the ones associated with the 600 Hz oscillator (those with frequencies near 600, 1200, 1800, 2400, and 3000). The top and bottom parts of Panel D reveal the components of the two different sources, Tone 1 and Tone 2. Thus, this method of learning produces appropriate results even when two different sources are simultaneously present.

Auditory scene analysis is the process by which the brain organizes sound into perceptually meaningful elements. Auditory scene analysis can be based on an algorithm that is fundamentally the same as the learning algorithm, but operating on a different time scale. The learning algorithm would operate slowly, adjusting connectivity between oscillators over time-scales of hours, days or even longer. The auditory scene analysis algorithm would operate quickly, over time-scales of tens of milliseconds to several seconds. Timescale is adjusted by adjusting the parameters $\delta_{ij}$ and $k_{ij}$ of Equations 5 and 6.

FIG. 4 can also be interpreted as the result of an auditory scene analysis process. As before, Panel A shows the amplitude response of the oscillator network, averaged over the last 12.5 ms. But under this interpretation, Panels B and C show the amplitude and phase of the auditory scene analysis matrix. In the amplitude matrix (Panel B) the peaks in the rows corresponding to the 500 Hz and 600 Hz oscillators are different. These peaks identify those oscillators whose activity is phase coherent with the oscillators of interest (500 and 600 Hz) over the relevant time scale. Panel D focuses on two rows of the amplitude matrix (Panel B), showing the amplitudes as a function of frequency. The oscillators associated with the 500 Hz oscillator (those with frequencies near 500, 1000, 1500, 2000, and 2500) are different from the ones associated with the 600 Hz oscillator (those with frequencies near 600, 1200, 1800, 2400, and 3000.). Panel D reveals the components of the two different sources, Tone 1 (black) and Tone 2 (gray). Thus, this method of computing an auditory scene analysis matrix by detecting multi-frequency coherence segregates frequency components into different sources. This method is capable of segregating sound components according to source, and recognizing coherent patterns of sound components.

By providing a network of nonlinear oscillators which behave as discussed above, signal analysis in a manner which more closely mimics the operation of the human ear and brain is possible. It should be understood that modifications, variations and changes in detail can be made to the described preferred embodiments of the invention by those skilled in the art. Therefore, it is intended that all matters in the foregoing description and shown in the accompanying drawings be interpreted as illustrative and not in a limiting sense. Thus, the scope of the invention is determined by the appended claims.

What is claimed is:

1. A method for learning connections between nonlinear oscillators in a neural network comprises the steps of:
   providing a plurality of nonlinear oscillators, each respective oscillator producing an oscillation distinct from the others in response to a common input;
   detecting an input at an at least first oscillator of the plurality of nonlinear oscillators;
   detecting an input at an at least a second oscillator of the plurality of the nonlinear oscillators;
   comparing the oscillation of the at least first oscillator to the oscillation of the at least second oscillator at a point in time;
   determining whether there is multi-frequency phase coherency between the oscillation of the at least first oscillator and the oscillation of the at least second oscillator; and
   changing at least one of the amplitude and phase of a connection between the at least first oscillator and the at least second oscillator as a function of the multi-frequency phase coherency between the oscillation of the at least second oscillator and the at least first oscillator.

2. A method for learning connections between nonlinear oscillators in a neural network comprises the steps of:
   providing a plurality of nonlinear oscillators, each respective oscillator producing an oscillation distinct from the others in response to an input, the connection being represented as $$\dot{c}_{ij} = -\delta_{ij} c_{ij} + k_{ij} \frac{z_i}{1 - \sqrt{\varepsilon}\, z_i} \cdot \frac{z_j}{1 - \sqrt{\varepsilon}\, \bar{z}_j}$$

where $c_{ij}$ is the magnitude and phase of the connection between any two nonlinear oscillators, $\delta$ and k are parameters representing the speed of change of connection, z is the complex valued state variables of the two connected oscillators.

3. The method of claim 1, further comprising the step of adjusting the phase of the connection to reflect the ongoing phase relationship between the at least first oscillator and the second oscillator when there is coherency between the oscillation of the at least first oscillator and the at least second oscillator.

4. The method of claim 1, further comprising the step of:
   decreasing the amplitude of connection between the at least first oscillator and the at least second oscillator when there is no coherency between the oscillation of the at least first oscillator and the oscillation of the at least second oscillator.

5. The method of claim 1, further comprising the step of:
   increasing the amplitude of connection between the at least first oscillator and the at least second oscillator when there is coherency between the oscillation of the at least first oscillator and the oscillation of the at least second oscillator.

6. A method for learning connections between nonlinear oscillators in a neural network comprises the steps of:
   providing a plurality of nonlinear oscillators, each respective oscillator producing an oscillation distinct from the others in response to a common input;
   detecting an input at an at least first oscillator of the plurality of nonlinear oscillators;
   detecting an input at an at least a second oscillator of the plurality of the nonlinear oscillators;
   comparing the oscillation of the at least one oscillator to the oscillation of the at least second oscillator at a point in time;
   determining whether there is multi-frequency phase coherency between the oscillation of the at least one oscillator and the oscillation of the at least second oscillator; and
   decreasing the amplitude of a connection between the at least first oscillator and the at least second oscillator and the second oscillator when the oscillation of the at least one oscillator is substantially multi-frequency phase coherent with the oscillation of the at least second oscillator.

7. A method for learning connections between nonlinear oscillators in a neural network comprises the steps of:
   providing a plurality of nonlinear oscillators, each respective oscillator producing an oscillation distinct from the others in response to an input;
   detecting an input at an at least first oscillator of the plurality of nonlinear oscillators;
   detecting an input at an at least a second oscillator of the plurality of the nonlinear oscillators;
   comparing the oscillation of the at least one oscillator to the oscillation of the at least second oscillator at a point in time;
   determining whether there is coherency between the oscillation of the at least one oscillator and the oscillation of the at least second oscillator; and
   decreasing the amplitude of a connection between the at least first oscillator and the at least second oscillator and the second oscillator when the oscillation of the at least one oscillator is substantially coherent with the oscillation of the at least second oscillator, the connection is being represented as $$\dot{c}_{ij} = -\delta_{ij}c_{ij} + k_{ij}\frac{z_i}{1-\sqrt{\varepsilon}\,z_i} \cdot \frac{\bar{z}_j}{1-\sqrt{\varepsilon}\,\bar{z}_j}$$

where $c_{ij}$ is the magnitude and phase of the connection between any two nonlinear oscillators, δ and k are parameters representing the speed of change of connection, z is the complex valued state variables of the two connected oscillators.

8. The method of claim 6, further comprising the step of adjusting the phase of the connection to reflect the ongoing phase relationship between the at least first oscillator and the second oscillator when there is coherency between the oscillation of the at least first oscillator and the at least second oscillator.

9. The method of claim 6, further comprising the step of:
increasing the amplitude of connection between the at least first oscillator and the at least second oscillator when there is coherency between the oscillation of the at least first oscillator and the oscillation of the at least second oscillator.

10. A method for performing auditory scene analysis comprising the steps of:
providing a plurality of nonlinear oscillators, each respective oscillator producing an oscillation distinct from the others in response to a common input;
detecting an input at an at least first oscillator of the plurality of nonlinear oscillators;
detecting an input at an at least a second oscillator of the plurality of the nonlinear oscillators;
comparing the oscillation of the at least first oscillator to the oscillation of the at least second oscillator at a point in time;
determining whether there is multi-frequency phase coherency between the oscillation of the at least first oscillator and the oscillation of the at least second oscillator; and
increasing the amplitude of a connection between the at least first oscillator and the at second least oscillator and the second oscillator when the oscillation of the at least first oscillator is multi-frequency phase coherent with the oscillation of the at least second oscillator.

11. A method for performing auditory scene analysis comprising the steps of:
providing a plurality of nonlinear oscillators, each respective oscillator producing an oscillation distinct from the others in response to an input;
detecting an input at an at least first oscillator of the plurality of nonlinear oscillators;
detecting an input at an at least a second oscillator of the plurality of the nonlinear oscillators;
comparing the oscillation of the at least first oscillator to the oscillation of the at least second oscillator at a point in time;
determining whether there is coherency between the oscillation of the at least first oscillator and the oscillation of the at least second oscillator; and
increasing the amplitude of a connection between the at least first oscillator and the at second least oscillator and the second oscillator when the oscillation of the at least first oscillator is coherent with the oscillation of the at least second oscillator, the connection being represented as $$\dot{c}_{ij} = -\delta_{ij}c_{ij} + k_{ij}\frac{z_i}{1-\sqrt{\varepsilon}\,z_i} \cdot \frac{\bar{z}_j}{1-\sqrt{\varepsilon}\,\bar{z}_j}$$

where $c_{ij}$ is the magnitude and phase of the connection between any two nonlinear oscillators, δ and k are parameters representing the speed of change of connection, z is the complex valued state variables of the two connected oscillators.

12. The method of claim 10, further comprising the step of adjusting the phase of the connection to reflect the ongoing phase relationship between the at least first oscillator and the second oscillator when there is coherency between the oscillation of the at least first oscillator and the at least second oscillator.

13. The method of claim 10, further comprising the step of:
decreasing the amplitude of connection between the at least first oscillator and the at least second oscillator when there is no coherency between the oscillation of the at least first oscillator and the oscillation of the at least second oscillator.

\* \* \* \* \*